United States Patent
Wahl et al.

(10) Patent No.: US 12,214,767 B2
(45) Date of Patent: Feb. 4, 2025

(54) METHOD AND DEVICE FOR CARRYING OUT AN AUTONOMOUS BRAKE APPLICATION IN A TWO-WHEEL MOTOR VEHICLE

(71) Applicant: Robert Bosch GmbH, Stuttgart (DE)

(72) Inventors: Anja Wahl, Markgroeningen (DE); Jan Schumacher, Ludwigsburg (DE); Markus Henzler, Stuttgart (DE); Matthias Klews, Tübingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 385 days.

(21) Appl. No.: 17/277,615

(22) PCT Filed: Oct. 1, 2019

(86) PCT No.: PCT/EP2019/076562
§ 371 (c)(1),
(2) Date: Mar. 18, 2021

(87) PCT Pub. No.: WO2020/119976
PCT Pub. Date: Jun. 18, 2020

(65) Prior Publication Data
US 2021/0347343 A1 Nov. 11, 2021

(30) Foreign Application Priority Data
Dec. 13, 2018 (DE) ...................... 10 2018 221 720.3

(51) Int. Cl.
B60T 8/17 (2006.01)
B60T 7/22 (2006.01)
(Continued)

(52) U.S. Cl.
CPC .............. *B60T 8/1706* (2013.01); *B60T 7/22* (2013.01); *B60T 8/171* (2013.01); *B60T 8/261* (2013.01);
(Continued)

(58) Field of Classification Search
CPC ....... A01B 69/007; B62D 5/065; B62D 5/091
See application file for complete search history.

(56) References Cited

U.S. PATENT DOCUMENTS 9,254,824 B2 * 2/2016 Ko ........................... B60T 7/22
2013/0066522 A1 * 3/2013 Haas ...................... B62K 21/00
701/41
(Continued)

FOREIGN PATENT DOCUMENTS

CN 108749818 A 11/2018
DE 102004018394 A1 11/2005
(Continued)

OTHER PUBLICATIONS

Machine translation of DE102012221615. (Year: 2014).*
International Search Report for PCT/EP2019/076562, Issued Jan. 15, 2020.

Primary Examiner — Adam D Tissot
(74) Attorney, Agent, or Firm — NORTON ROSE FULBRIGHT US LLP; Gerard A. Messina

(57) ABSTRACT

A method for carrying out an autonomous brake application in a two-wheel motor vehicle. In the method, the need for a vehicle deceleration is detected with the aid of a surroundings sensor system; depending thereon, a driver-independent vehicle deceleration is initiated; once the vehicle deceleration has been initiated, a driver readiness variable characterizing the readiness of the driver to control the vehicle deceleration maneuver is ascertained; and the temporal progression of the vehicle deceleration is continued depending on the driver readiness variable.

10 Claims, 2 Drawing Sheets

(51) Int. Cl.
*B60T 8/171* (2006.01)
*B60T 8/26* (2006.01)
*B60T 8/32* (2006.01)

(52) U.S. Cl.
CPC ....... *B60T 8/3225* (2013.01); *B60T 2201/022* (2013.01); *B60T 2210/00* (2013.01)

(56) References Cited

U.S. PATENT DOCUMENTS

| | | |
|---|---|---|
| 2014/0015662 A1 | 1/2014 | Oettgen |
| 2017/0057513 A1* | 3/2017 | Ohashi .................. B60T 8/3225 |

FOREIGN PATENT DOCUMENTS

| | | | | |
|---|---|---|---|---|
| DE | 102012221615 A1 | * | 5/2014 | ............. B60T 7/085 |
| DE | 102015217257 A1 | * | 3/2017 | ............ B60W 30/08 |
| DE | 102017201693 A1 | | 8/2018 | |
| DE | 102017210500 A1 | | 12/2018 | |
| JP | 2017087827 A | | 5/2017 | |
| JP | 2018118716 A | | 8/2018 | |
| JP | 2018134990 A | * | 8/2018 | ............ B60K 28/14 |
| JP | 2019172155 A | | 10/2019 | |
| WO | 2018154398 A1 | | 8/2018 | |
| WO | 2018185577 A1 | | 10/2018 | |
| WO | 2018216308 A1 | | 11/2018 | |

\* cited by examiner

METHOD AND DEVICE FOR CARRYING OUT AN AUTONOMOUS BRAKE APPLICATION IN A TWO-WHEEL MOTOR VEHICLE

BACKGROUND INFORMATION

German Patent Application No. DE 10 2017 210 500.3 describes a method for operating a driver assistance system for a two-wheeler. In the method, in a step of intervention, the driver assistance system intervenes as a function of a driver-specific vehicle dynamics profile and an instantaneous driving condition, the vehicle dynamics profile representing a correlation between inclined-position values at which a driver of the two-wheeler drove in the past and acceleration values at which he/she drove at the same time, and the driving condition being characterized by an instantaneously detected acceleration value and an instantaneously detected inclined-position value.

SUMMARY

The present invention relates to a method for carrying out an autonomous brake application in a two-wheel motor vehicle, in particular a motorcycle. In accordance with an example embodiment of the present invention, in the method:

the need for a vehicle deceleration is detected with the aid of a surroundings sensor system, depending thereon, a driver-independent vehicle deceleration is initiated, once the vehicle deceleration has been initiated, a driver readiness variable characterizing the readiness of the driver to control the vehicle deceleration maneuver is ascertained, and the temporal progression of the vehicle deceleration is continued depending on the driver readiness variable.

The present invention allows for the reduction of risk during an automatic emergency brake application of a two-wheeler. A driver who is not prepared for the brake application and is distracted may completely lose control of the two-wheeler in such a situation. For this reason, it is meaningful to incorporate a driver readiness variable characterizing the readiness of the driver to control the vehicle deceleration maneuver into the emergency brake application.

In one advantageous embodiment of the present invention, the surroundings sensor system is a radar sensor system, a LIDAR sensor system, or a video sensor system. Such sensor systems are already widespread in the passenger car sector and may also be utilized in the two-wheeler sector.

In one advantageous embodiment of the present invention, the driver readiness variable may assume at least two different values.

In one advantageous embodiment of the present invention, the driver readiness variable may assume three values, one of the three values signaling a state of the driver in which he/she is ready for the vehicle deceleration maneuver, another of the three values signaling a neutral state of the driver, and the remaining of the three values signaling a state of the driver in which he/she is not ready for the vehicle deceleration maneuver.

In one advantageous embodiment of the present invention:

in a ready state of the driver, the autonomous brake application is carried out with the aid of a planned setpoint braking force curve, in a neutral state of the driver, the autonomous brake application is carried out with the aid of a braking force curve, which, as compared to the planned setpoint braking force curve, has a lower deceleration and/or a less intense jolt.

in a state of the driver in which he/she is not ready, the autonomous brake application is either aborted or carried out with a braking force curve which in comparison to a braking force curve in a neutral state of the driver has a lower deceleration and/or a less intense jolt.

By performing the emergency brake application at a lower intensity when the driver state is recognized as being not ready, it is possible to reduce the risk of the driver crashing due to a loss of control of the two-wheeler. Nevertheless, due to the weaker emergency brake application, the attentiveness of a distracted driver is directed onto the present driving situation, since the emergency brake application simultaneously functions as a driver warning.

In one advantageous embodiment of the present invention, the driver readiness variable is ascertained after the initiation of the driver-independent vehicle deceleration on the basis of the output signals of an inertial sensor system mounted at the motor vehicle.

In one advantageous embodiment of the present invention, the driver readiness variable is ascertained after the initiation of the driver-independent vehicle deceleration on the basis of the steering angle and/or the steering torque.

In one advantageous embodiment of the present invention, the driver readiness variable is ascertained after the initiation of the driver-independent vehicle deceleration on the basis of the output signals at pressure-sensitive contact sensors mounted at the motor vehicle.

In one advantageous embodiment of the present invention, the driver readiness variable is ascertained after the initiation of the driver-independent vehicle deceleration on the basis of the output signals of wheel speed sensors or compression travel sensors.

In addition, the present invention includes a device which includes a means designed for carrying out the method according to the present invention. The device is a control unit, in particular, in which the program code for carrying out the method according to the present invention is stored.

DETAILED DESCRIPTION OF EXAMPLE EMBODIMENTS

If an anticipatory sensor system initiates a braking maneuver, then, after the braking maneuver has been initiated, the response of the overall system made up of the vehicle and the driver may be ascertained with the aid of sensors located at the vehicle. On the basis of this ascertained response, the present state of the driver may be modeled. As a function of this driver state, the further braking maneuver may be parameterized. If it is detected that the driver is not ready for braking, the deceleration is reduced or entirely retracted, so that the maneuver remains controllable. Due to the fact that the automatic braking maneuver already begins before the assessment of the driver is completed, a considerable braking distance may be saved in the case of emergency brake applications having a strong deceleration.

The anticipatory sensor systems or surroundings sensor system may be a radar sensor system, a LIDAR sensor system, or a video sensor system. In addition, networked systems may be considered in the future to be virtual sensors, which may initiate an autonomous braking maneuver.

On the basis of the output signals of the surroundings sensor system, a setpoint deceleration is ascertained and a trigger signal is transmitted to the braking system, which initiates the braking maneuver. The braking system initiates the deceleration by reducing the engine torque or increasing the braking torque, without first knowing the state of the driver. In particular, a neutral driver state may be assumed. By measuring the overall system response, the state of the driver may be modeled. In a first step, for this purpose, a maneuver readiness of the driver is derived from the measurement results of the inertial sensor system. If, for example, a deceleration torque is applied and the driver has only one hand at the handlebar, the support torque of the driver effectuates a movement of the handlebar. This movement effectuates a change of the dynamics of the overall system made up of the driver and the vehicle, which is registered with the aid of an inertial measuring method. On the basis thereof, it may be inferred that the driver holds the handlebar with only one hand and, therefore, is not ready for the deceleration maneuver.

Figure 2:
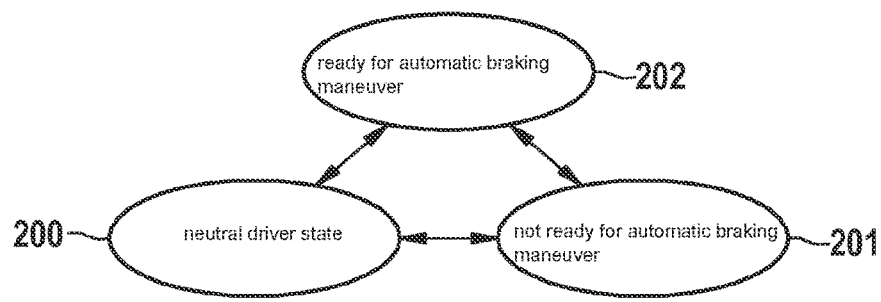
In FIG. 2, a state diagram for three driver states is represented.

The model of the driver may contain, for example, three states, as represented in FIG. 2. There, block 200 represents the "neutral" state, block 201 represents the "not ready for maneuver" state, and block 202 represents the "ready for maneuver" state.

Depending on this state, during a triggered brake application, the setpoint brake application is carried out when the "ready for maneuver" driver state was detected. If the "not ready for maneuver" driver state was ascertained, a maneuver having an adapted deceleration is carried out. For example, the absolute value of the deceleration during the adapted brake application may be reduced as compared to the setpoint value. Additionally or alternatively, the jolt, i.e., the temporal derivative of the deceleration, may be reduced. If the state of the driver changes during the course of the maneuver, the braking maneuver may also be appropriately varied.

Moreover, in order to ascertain the driver state, the following sensor signals may be evaluated:
   a steering response of the vehicle may be ascertained on the basis of the steering angle and/or the steering torque,
   the pitch movement of the vehicle may be ascertained with the aid of a compression travel sensor system,
   wheel speed sensors,
   pressure-sensitive contact sensors, in order to measure the extent of the support at contact points such as, for example, at grips, knees, or feet.

Figure 1:
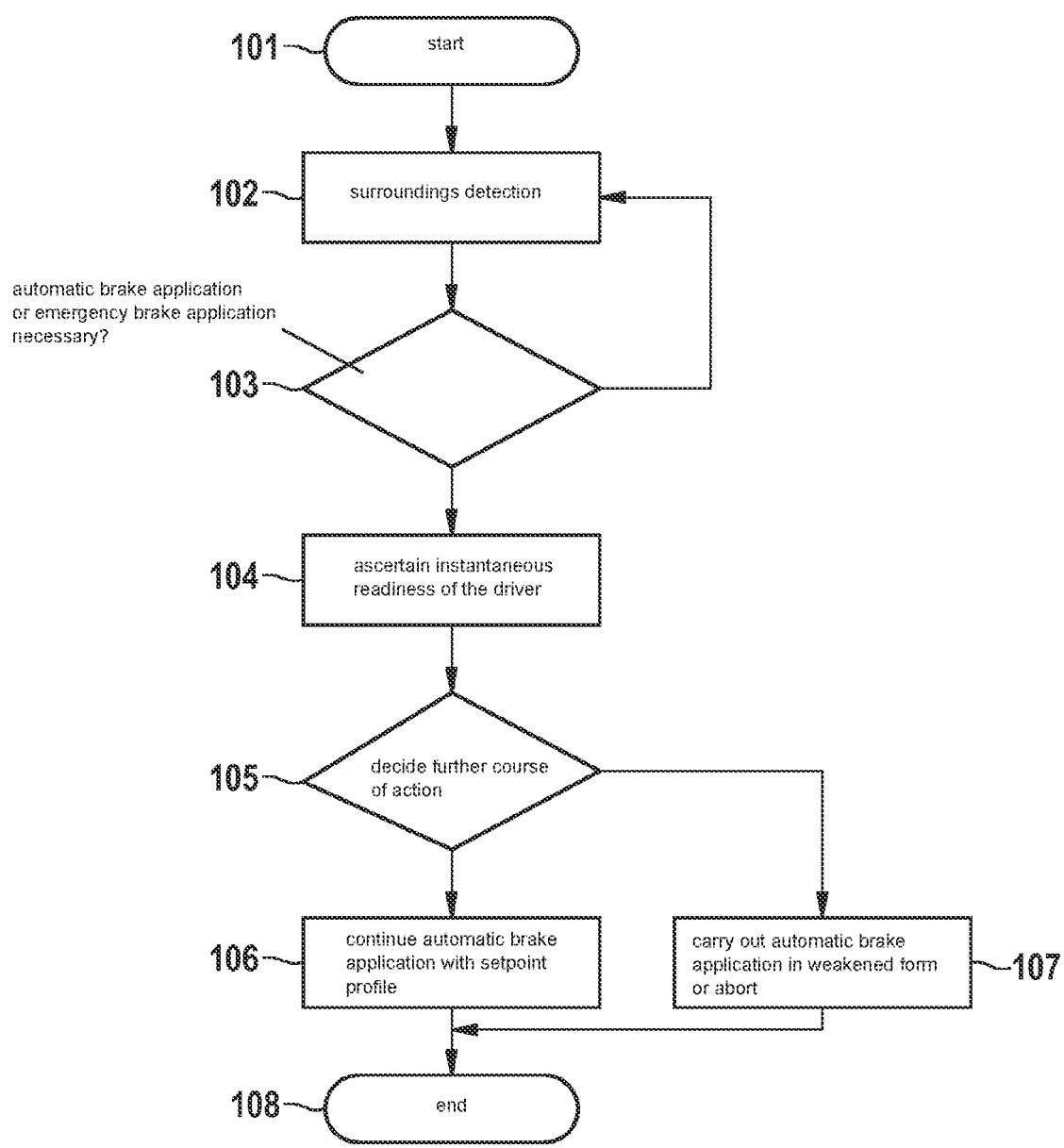
In FIG. 1, the temporal sequence of one example embodiment of the present invention is represented.

FIG. 1 shows the temporal sequence of one embodiment of the present invention. After the start of the method in block 101, a surroundings detection is carried out in block 102. Therein, it is ascertained whether an automatic brake application or emergency brake application is necessary. If this is the case, an automatic brake application is started in block 103. If brake application is not necessary, there is a switch from block 103 back to block 102. On the basis of data gathered during the brake application, the instantaneous readiness of the driver to control the automatic brake application is ascertained in block 104 with the aid of a driver state model. Depending thereon, in block 105, a decision is made regarding the further course of the brake application. In FIG. 1, for this purpose, two possible curves of braking force over time are utilized, by way of example. If the driver state is ascertained as being ready for braking, the automatic brake application, which has begun, is continued in block 106 as planned with its setpoint profile. If the driver state is ascertained as not being ready for braking, however, the automatic brake application, which has begun, is carried out in block 107 only in a weakened form or is even aborted. The method ends in block 108.

FIG. 2 shows, in the form of a state graph, by way of example, the following states:
   Block 200: neutral driver state
   Block 201: "not ready for automatic braking maneuver" driver state
   Block 202: "ready for automatic braking maneuver" driver state The bilaterally directed arrow connections between the three states indicate that a transition between the different states is also possible when the driver state changes during the automatic braking maneuver.

Figure 3:
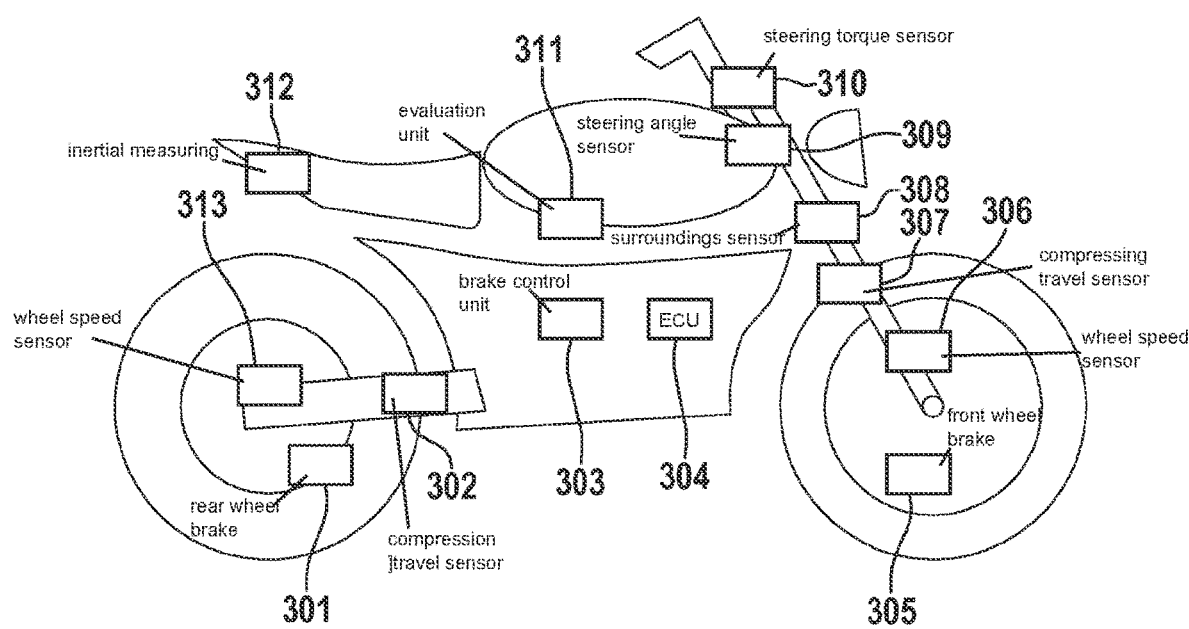
In FIG. 3, a schematic side view of a motorcycle is represented, including means motorcycle components, which are usable for the present invention.

In FIG. 3, a schematic side view of a motorcycle is represented, including the following essential motorcycle components, which are usable for the present invention.
   301: rear wheel brake
   302: compression travel sensor at the rear wheel
   303: brake control unit
   304: engine control unit
   305: front wheel brake
   306: wheel speed sensor at the front wheel
   307: compression travel sensor at the front wheel
   308: surroundings sensor
   309: steering angle sensor
   310: steering torque sensor
   311: evaluation unit for the driver state
   312: inertial measuring method
   313: wheel speed sensor at the rear wheel

What is claimed is:

1. A method for carrying out an autonomous brake application in a two-wheel motor vehicle, comprising:
   initiating a driver-independent vehicle deceleration in response to a surroundings sensor system;
   once the vehicle deceleration has been initiated, ascertaining a driver readiness variable characterizing a readiness of the driver to control a vehicle deceleration maneuver; and
   discontinuing a temporal progression of the vehicle deceleration as a function of the driver readiness variable,
   wherein:
   the driver readiness variable signals a neutral state of the driver, and
   in the neutral state of the driver, the autonomous brake application is carried out with the aid of a first braking force curve that, in comparison to a second braking force curve associated with a planned setpoint and implemented when the driver readiness variable signals that the driver is ready for the vehicle deceleration maneuver, has a lower deceleration and/or a less intense jolt.

2. The method as recited in claim 1, wherein the surroundings sensor system includes a radar sensor system, or a LIDAR sensor system, or a video sensor system.

3. The method as recited in claim 1, wherein the driver readiness variable may assume at least two different values.

4. The method as recited in claim 3, wherein when the driver readiness variable does not signal that the driver is ready for the vehicle deceleration maneuver and does not signal the neutral state of the driver, the driver readiness variable signals a state of the driver in which the driver is not ready for the vehicle deceleration maneuver.

5. The method as recited in claim 4, wherein:
in the not ready state of the driver, the autonomous brake application is either: (i) aborted, or (ii) carried out with the aid of a braking force curve, which, in comparison to the braking force curve in the case of a neutral state of the driver, has a lower deceleration and/or a less intense jolt.

6. The method as recited in claim 1, wherein the driver readiness variable is ascertained after the initiation of the driver-independent vehicle deceleration based on output signals of an inertial sensor system mounted at the motor vehicle.

7. The method as recited in claim 1, wherein the driver readiness variable is ascertained after the initiation of the driver-independent vehicle deceleration based on a steering angle and/or a steering torque.

8. The method as recited in claim 1, wherein the driver readiness variable is ascertained after the initiation of the driver-independent vehicle deceleration based on output signals at pressure-sensitive contact sensors mounted at the motor vehicle.

9. The method as recited in claim 1, wherein the driver readiness variable is ascertained after the initiation of the driver-independent vehicle deceleration based on output signals of wheel speed sensors or compression travel sensors.

10. A device for carrying out an autonomous brake application in a two-wheel motor vehicle, the device configured to:
initiate a driver-independent vehicle deceleration in response to an output of a surroundings sensor system;
once the vehicle deceleration has been initiated, ascertain a driver readiness variable characterizing a readiness of the driver to control a vehicle deceleration maneuver; and
discontinue a temporal progression of the vehicle deceleration as a function of the driver readiness variable, wherein:
the driver readiness variable signals a neutral state of the driver, and
in the neutral state of the driver, the autonomous brake application is carried out with the aid of a first braking force curve that, in comparison to a second braking force curve associated with a planned setpoint and implemented when the driver readiness variable signals that the driver is ready for the vehicle deceleration maneuver, has a lower deceleration and/or a less intense jolt.

\* \* \* \* \*